(No Model.)

H. H. HOLLISTER & T. H. HULL.
HARROW.

No. 434,711. Patented Aug. 19, 1890.

WITNESSES
Aly Buchanan
F. J. F. Johnson

INVENTORS:
H. H. Hollister
and T. H. Hull
By I. N. Kalb
Their Attorney

UNITED STATES PATENT OFFICE.

HERSCHEL H. HOLLISTER AND THOMAS H. HULL, OF SCRANTON, PENNSYLVANIA.

HARROW.

SPECIFICATION forming part of Letters Patent No. 434,711, dated August 19, 1890.

Application filed November 19, 1889. Serial No. 330,824. (No model.)

*To all whom it may concern:*

Be it known that we, HERSCHEL H. HOLLISTER and THOMAS H. HULL, citizens of the United States, residing at Scranton, in the county of Lackawanna and State of Pennsylvania, have invented certain new and useful Improvements in Harrows; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to harrows for pulverizing and smoothing ground for agricultural purposes; and has for its object the provision of certain improvements in the style and character of harrow for which we made application for Letters Patent of the United States on the first day of June, 1889, Serial No. 312,860; and the present invention consists in certain novel means for adjusting the rake or dig of the harrow-teeth and for holding them when so adjusted, and also an improved manner of connecting the two portions of the harrow, which in this invention, as in the preceding one herein referred to, we prefer to make in two sections hinged together centrally.

The invention will be understood from the following detailed description, and pointed out in the claims.

The accompanying drawings illustrate what we consider the best means for carrying our invention into practice.

Figure 1:
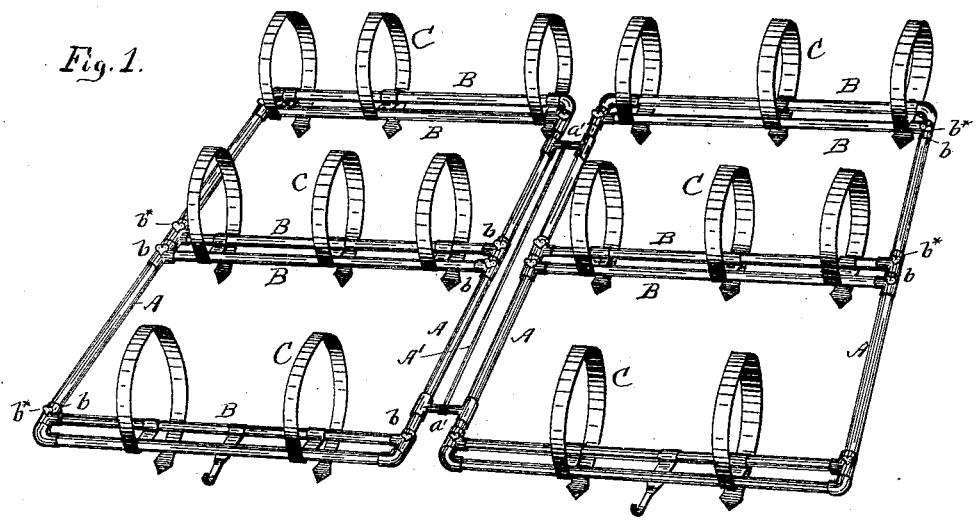
Figure 3:
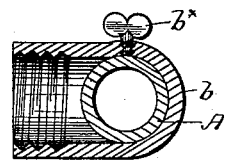
Figure 2:
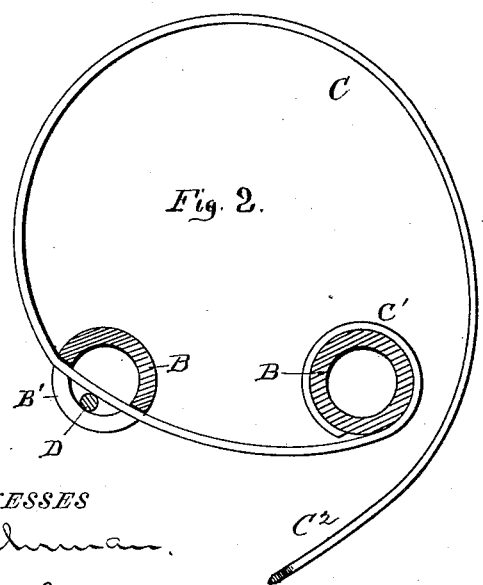

Figure 1 is a perspective view of a harrow, showing our improvements. Fig. 2 is a section of a pair of cross-bars, showing how a tooth is applied. Fig. 3 is a section of the end connection of the cross-bars.

Similar letters of reference indicate corresponding parts in all the figures where they occur.

A A are the main frames of the harrow, which may be square or butterfly shaped, as explained in our previous application. The frames are preferably made of gas-pipe or other tubing, for the sake of lightness, and are connected together by hinges $a$ $a$, which are attached to T-couplings $a'$ $a'$, which are secured upon the side bars of the frame. A metal rod $A'$ extends from hinge to hinge and forms the pintle for both hinges. The cross-bars B B are made of tubing also, and to them the teeth C are attached. The cross-bars B B are connected to the side bars of the frame by means of sliding T-heads $b$ $b$, which can be moved along the side bars and fixed at any position by means of set-screws $b^*$ $b^*$, which pass through the T-heads and impinge upon the side bars. Each tooth is lapped or twisted round one bar B, as shown at $C'$, and is carried under the next forward bar, where the latter is cut out, as shown at $B'$, and allows the tooth to be set in the recess, and a rod D is passed through the tube under the tooth, which serves to hold it in place. Now it will be apparent that when the bars B B are spread farther apart the digging end $C^2$ of tooth C will be raised and it will not have so much depth beneath the cross-bars, so that when it is desired to shorten the teeth and give them less dig the bars B B are slipped farther apart on the side bars A A and are fastened at the desired point by the set-screws $b^*$ $b^*$. On the other hand, when it is desired to give the teeth more dig the bars B B are brought nearer together and the end $C^2$ beneath the bars B is accordingly lengthened and the bars are fastened by the set-screws as before. Thus it will be seen that the dig of the teeth can be regulated to a great nicety and with great ease and quickness. This adjustment and its effect upon the teeth is illustrated by full and dotted lines in Fig. 2.

Having thus described our invention, what we claim, and desire to secure by Letters Patent, is—

1. The combination of the adjustable bars B B, one of which is provided with a recess or recesses $B'$, a tooth or teeth secured to one bar and passed under the other in recess or recesses $B'$, and a rod D, inserted through forward tubular bar beneath the teeth, substantially as set forth.

2. The combination of the bars B B, having the sliding T-heads $b$ $b$, adjustable on the side bars of teeth C, secured to one bar B and passed under the other in recesses B', and a rod D, inserted in the recessed tubular bar B beneath the teeth, as set forth.

3. The herein-described harrow, consisting of the two frames formed of tubular pieces, hinged T-pieces on the adjoining sides of said frames and a rod forming the pintle of such T-pieces at both ends, adjustable cross-bars B B, arranged in pairs, one of which is provided with recesses B', teeth C, secured to one bar and passed under the other in recesses, and a rod D, inserted through the forward tubular bar beneath the teeth, as set forth.

In testimony whereof we affix our signatures in presence of two witnesses.

HERSCHEL H. HOLLISTER.
THOMAS H. HULL.

Witnesses:
THOMAS BUSHNELL,
O. B. WRIGHT.